United States Patent [19]

Goldman

[11] Patent Number: 4,916,294
[45] Date of Patent: Apr. 10, 1990

[54] SYSTEM FOR RELIABLE DIGITAL RECORDING ON UNRELIABLE MAGNETIC MEDIA

[75] Inventor: Robert N. Goldman, Honolulu, Hi.

[73] Assignee: Light Signatures, Inc., Los Angeles, Calif.

[21] Appl. No.: 223,311

[22] Filed: Jul. 25, 1988

[51] Int. Cl.[4] .......................... G06K 5/00; G06K 7/08
[52] U.S. Cl. .................................. 235/449; 235/437; 235/493; 360/25; 369/58
[58] Field of Search ................. 369/53, 58; 360/2, 25, 360/31; 235/449, 493, 436, 437, 438, 440, 384, 494, 487, 488

[56] References Cited

U.S. PATENT DOCUMENTS

| | | | |
|---|---|---|---|
| 3,501,622 | 3/1970 | Weir et al. | 235/384 |
| 3,755,731 | 8/1973 | Young | 360/25 |
| 3,946,206 | 3/1976 | Darjany | 235/493 |
| 3,947,875 | 3/1976 | Bull et al. | 360/25 |
| 4,146,175 | 3/1979 | Daboub et al. | 235/494 |
| 4,255,807 | 3/1981 | Cosby | 360/25 |
| 4,764,915 | 8/1988 | Efron et al. | 369/58 |

*Primary Examiner*—Aristotelis M. Psitos
*Assistant Examiner*—Robert A. Weinhardt
*Attorney, Agent, or Firm*—Nilsson, Robbins, Dalgarn, Berliner, Carson & Wurst

[57] ABSTRACT

A system for reliably recording digital data on marginal magnetic recording medium by utilizing a two-track format and testing to locate pairs of record-quality areas of the medium. A magnetic stripe on a document is defined into a pair of recording tracks each with a sequence of bit locations. Associated pairs of bit locations (one from each track) are jointly tested for recording quality. One bit location of poor quality eliminates the pair; however, if both bit locations meet a standard, they are employed cooperatively to record data. Specifically, each bit location initially is recorded with a pulse. Any pair of bit locations which cannot meet the standard is totally cleared (erased), while pairs of bit locations meeting the standard are selectively erased to represent digital data.

14 Claims, 2 Drawing Sheets

SYSTEM FOR RELIABLE DIGITAL RECORDING ON UNRELIABLE MAGNETIC MEDIA

BACKGROUND AND SUMMARY OF THE INVENTION

In many applications it is critically important to minimize the cost of documents that are capable of carrying changeable magnetically encoded information. For example, several transportation systems use small cardboard tickets bearing a magnetic stripe that serves to account for the current value of the ticket. A system may be based on single-use tickets or on multiple-use tickets. In the latter case, the purchase value of the ticket is decremented with use, the instant value being printed on the ticket and recorded on the magnetic stripe. Of course, other information also may be recorded on the magnetic stripe.

In contrast to conventional plastic credit cards (bearing a magnetic stripe), transportation cards or decrementing tickets normally have a very short life involving a limited number of uses. As a consequence and in view of the great volume of paper tickets consumed, any significant reduction in the cost of producing the tickets results in a considerable economy.

It has been proposed to produce inexpensive magnetic stripe documents by printing the stripe on paper. While the technique has been used, accomplishing a reliable recording medium generally imposes severe constraints on the production process. Accordingly, a considerable need exists for an improved method and apparatus involving a document bearing a magnetic medium of marginal quality. For example, as contemplated by the present invention, a magnetic stripe may be applied on paper by a high speed printing process to provide a marginal magnetic recording medium which may be reliably used to carry changeable digital information in accordance with the present invention.

In general, the system of the present invention involves defining a pair of record tracks on a marginal magnetic stripe, each track defining a series of binary bit locations. In accordance with the disclosed embodiment, "one" digits preliminarily are recorded in each bit location of each track. Associated pairs of the bit locations (one from each track) are utilized to record information if the pair possesses a standard of record quality. Pairs of bit locations that do not meet the standard of record quality are cleared of data and ignored by the system. Note that active record areas need not be contiguous but may occur as distinct sections of the magnetic stripe. Accordingly, some reduction in the relative overall speed of reading and recording is to be expected.

Recognizing the existence of several magnetic recording formats for digital information, the disclosed embodiment utilizes an exemplary pulse recording technique along with selective erasure. That is, pulses representing "one" digits are recorded in each bit location of both tracks. The recorded tracks are then sensed to measure the recording quality of the bit locations on the basis of pulse amplitude. If either bit location in an associated pair is defective, the pair is erased (cleared to "zero" or greater) and disregarded.

If a pair of bit locations meets a standard of record quality, three possible situations are used to record information. Specifically, as possible situations, the recorded pulse may be erased in either of the two bit locations, or both pulses may be permitted to remain. Thus, based on the three possible data situations, a trinary code may be employed as disclosed in detail below. Other formats are practical as disclosed below.

BRIEF DESCRIPTION OF THE DRAWINGS

In the drawings, which constitute a part of this specification, exemplary formats of the invention are set forth as follows.

DESCRIPTION OF THE ILLUSTRATIVE EMBODIMENT

As indicated above, a detailed illustrative embodiment of the present invention is disclosed herein. However, physical media, data formats and operating apparatus structured in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
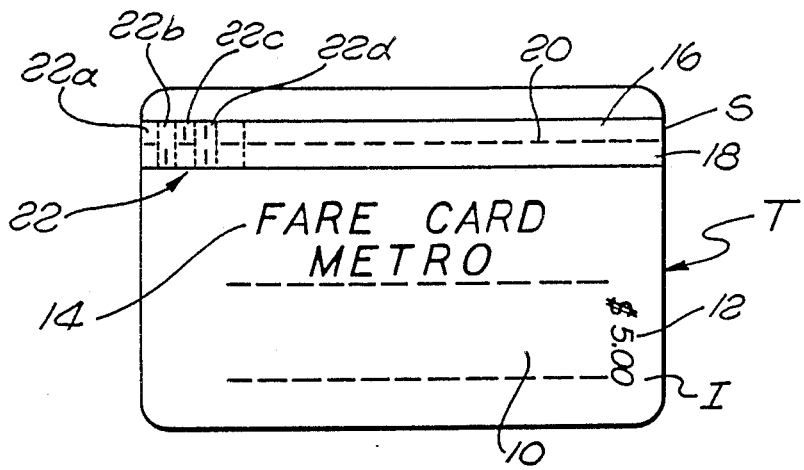
FIG. 1 is a plan view of a document embodying the present invention.

Referring initially to FIG. 1, an illustrative document is represented in the form of a consumable transportation card or ticket T. Such a ticket would be sold (as by a dispensing machine) bearing a specific value, indicated by indicia I and also recorded on a magstripe S.

As the ticket T is used, fare amounts are charged by decrementing the card to maintain a current value. Specifically, the indicia I is altered to indicate the current value in print and the stripe S is similarly updated by machine processing. Thus, the ticket T is consumed when it has been used to pay an aggregate sum of fares equal to its original value.

Structurally, the ticket T is formed of paper to provide a sheet of substrata for the elongate magnetic stripe S. As discussed below, for economy in the disclosed embodiment, the stripe S is printed on the ticket along with the indicia I. As illustrated, the indicia I includes a column 10 headed by a designation 12 of the initial value. As the ticket is used, the value designation 12 is canceled (as by overstamping) and reduced designation figures are printed in the column 10.

The indicia I also include identification data indicating details and use of the card. Of course, various instructions, limitations and other information may be included as indicia I along with the name of the issuing organization. Data other than value also may be recorded on the magnetic stripe S.

The magnetic stripe S is of relatively low quality. For example, depositing the stripe S by high speed printing equipment may result in flaws, pits and other irregularities that would render the stripe unsatisfactory for use in many conventional applications. However, in accordance with the present invention, the stripe S is selectively used (area-by-area, in which an area may be as small as a single bit position) and defective areas are disqualified and avoided. Consider the format of the stripe S in somewhat greater detail.

As illustrated in FIG. 1, the stripe S is marked to indicate a record format. Actually, format is neither visible on the stripe S nor is it illustrated in scale. Rather, the indications merely serve preliminarily to explain the nature of the recording format.

The magnetic stripe S is divided by a dashed line 20 into two parallel record tracks 16 and 18. The lengths of the tracks 16 and 18 are divided into side-by-side, associated bit locations 22 (FIG. 1, upper left). Each pair of side-by-side bit locations may have any one of four recorded states. Specifically, a pair of bit locations may contain a defect with the consequence that the pair does not have record quality and, accordingly, is left void of any recorded pulse. A void pair 22a is indicated at the left end of the stripe 18.

As two other possible states, a bit pair may record a pulse in one or the other of the two tracks 16 or 18. In that regard, a pair 22b illustrates a pulse recorded in the lower track 18. A pair 22c illustrates a pulse recorded in the upper track 16.

The fourth possible state for a bit pair involves a pulse recorded in both of the tracks 16 and 18. The status is illustrated for the bit pair 22d. Thus, three of the states manifest data.

Recapitulating to some extent, the parallel tracks 16 and 18 are defined into pairs of associated bit locations which are either disqualified as structurally defective for data or utilized to record a three-bit or trinary code. For example, using the states identified above, the trinary code may simply take the form:

| Decimal Equivalent | Track 16 | Track 18 |
| --- | --- | --- |
| 0 | pulse | clear |
| 1 | clear | pulse |
| 2 | pulse | pulse |
| void | clear | clear |

As shown, record pairs always contain a pulse and accordingly are self-clocking. Of course, any of a wide variety of code formats and recording techniques may be employed within the basic conceptual notion of bit locations in associated pairs, both of which meet a standard for utilization.

Preliminary to considering the system for producing the ticket T, some further explanation is deemed appropriate with regard to the exemplary recording format. In that regard, reference will now be made to FIG. 2 showing a fragment of the tracks 16 and 18 in FIGS. 2(a), 2(b) and 2(c) to illustrate three stages of the data recording operation.

As previously explained, FIG. 2 shows the separate tracks 16 and 18 (A and B respectively) divided along their length into pairs of bit locations generally designated by the reference numeral 22. Accordingly, as the ticket T (FIG. 1) moves in relation to magnetic read-write structures, digit locations 22 are defined in associated pairs 24 along the length of the stripe S. As illustrated in FIG. 2, the associated bit locations 24 of the two tracks 16 and 18 are aligned side-by-side, e.g. bit locations 26 and 28. Other arrangements should be recognized as possibilities for associating pairs of bits.

Figure 2A:
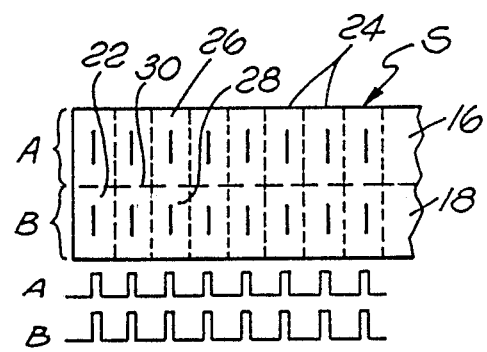
FIG. 2(a)–(c) is a graphic representation illustrating a recording format in accordance with the present invention.
Figure 2B:
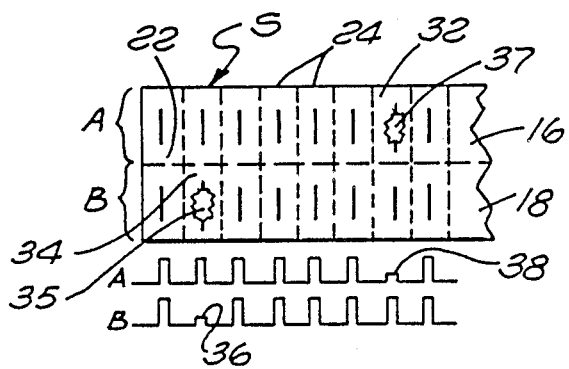
Figure 2C:
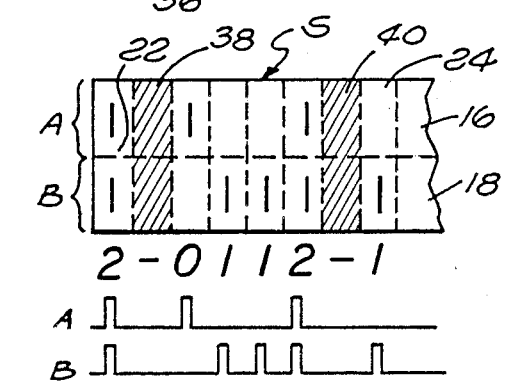

An initial step to record data is illustrated in FIG. 2(a). An attempt is made to record a uniform pulse in every bit location of both tracks. Waveforms A and B are illustrated below the stripe S to indicate the drive signals for recording the pulses.

FIG. 2(a) illustrates an idealized result of the recording program. Actually, as explained above, voids and other defects in the stripe S will likely inhibit or limit the recording of a pulse in certain of the bit locations. However, where the bit locations are capable of standard recording, a standard pulse is recorded. An exemplary actual record, with defective areas, is illustrated in FIG. 2(b).

The next step in the process involves reading the recorded pulses along tracks 16 and 18 to determine the effectiveness of each bit location to record a pulse. As illustrated in FIG. 2(b), bit locations 32 (track 16) and 34 (track 18) contain magnetic voids 35 and 37 with the consequence that the standard pulse was not recorded. Accordingly, sensing the bit locations 32 and 34 produces minimal pulses.

The testing step of the process (FIG. 2(a)) involves reading the recorded pulses along the tracks 16 and 18 to provide waveforms A and B, respectively, as illustrated at the bottom of FIG. 2b. As shown, the waveforms A and B contain signal pulses aligned with the pulses recorded in digit locations of the tracks A and B. Accordingly, below the defective bit location 34 in the waveform B, a very small marginal pulse 36 is indicated. Similarly, a marginal pulse 38 is indicated in the waveform A below the bit location 32.

On the basis of the small amplitude of pulses 36 and 38, the bit locations 32 and 34 are disqualified as not being of record quality. Furthermore, the associated bit locations paired with each of the locations 32 and 34 are also disqualified. Accordingly, the disqualified bit location pairs are indicated by shaded areas 38 and 40 in FIG. 2(c).

In addition to defining the void bit location pairs (shaded) along the stripe S, the exemplary process also selectively erases pulses in record quality bit locations to accomplish recorded data as illustrated in FIG. 2(c). That is, the erasures involve two aspects. First, the shaded areas 38 and 40 (FIG. 2c) are erased to clear any record of a pulse that may exist. Second, selective pulses are erased from other bit locations to accomplish recorded data utilizing the trinary format explained above.

As an example, assume a desire to record a numerical sequence "2,0,1,1,2,1". The data is illustrated in FIG. 2(c) as it is accomplished by selective erasure. Beginning at the left of the stripe as illustrated in FIG. 2(c), the pulses of the initial pair remain recorded to represent "2". The next pair of locations constitute the void area 38. In the following pair, a pulse is erased from track 18 leaving a pulse in track 16 to manifest a "0". The reverse is true for the following pair in that the pulse is erased from the track 16 but the pulse remains in the digit location of track 18 to indicate "1". Thus, selective erasure accomplishes the assumed numerical sequence and as would be manifest on sensing by waveforms A and B as represented in FIG. 2(c).

In summary, the process of the present invention involves first attempting to record a pulse in every bit location of a pair of associated tracks. Next, the bit locations are sensed and pairs of bit locations are designated void if either or both bit locations are incapable of effective recording. The remaining record quality bit locations are then selectively erased to leave a record of the desired data. As indicated above, a large number of coding and record techniques and formats may be utilized to variously accomplish a reliable record in accordance with the principles disclosed herein.

Figure 3:
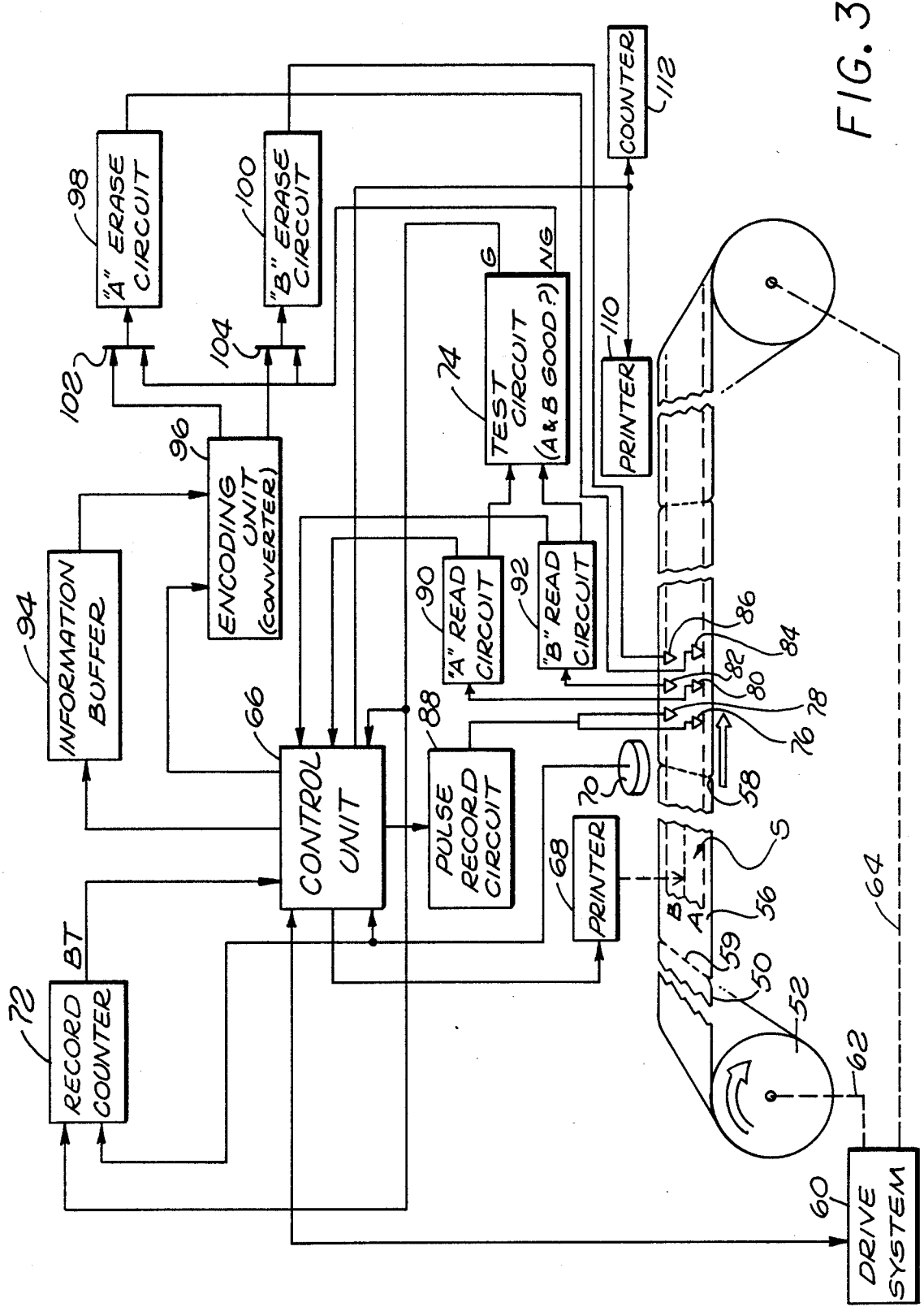
FIG. 3 is a block and symbolic representation of a system constructed in accordance with the present invention.

Reference will now be had to FIG. 3 showing a structural system for executing the process as generally described above. The system produces tickets T from a web of paper illustrated generally at the bottom of FIG. 3. A considerable length of paper 50 is exposed as the web moves linearly from a roll 52 to a roll 54. The exposed length of paper 50 includes a number of raw cards or tickets T defined by perforations. Moving from the roll 52 to the roll 54, the raw tickets are transformed into finished units or rejects. Specifically, the tickets are printed with a magnetic stripe after which the magnetic stripe is processed as described above to accomplish a completed ticket T. Those raw tickets incapable of being processed are designed with a cancellation stamp as rejects. Note that an alternative embodiment may incorporate a burster structure to separate the tickets immediately on manufacture. Such structure is well known in the art. The elements of the production system will now be considered in detail.

The perforated web of paper 50 is moved from the roll 52 to a roll 54 by a mechanical drive system 60. In that regard, mechanical linkages are represented by dashed lines 62 and 64 coupling the drive system 60 to the rolls 52 and 54.

The drive system 60 is electrically connected to a control unit 66 (FIG. 3, central) incorporating digital computation and control capability. The control unit 66 is programmed to correlate the movement of the paper 50 with printing, sensing and recording apparatus as described below. In that regard, various control-drive techniques are well known in the prior art capable of precise monitoring and displacement.

Consider the length of the paper 50 including an exemplary raw-ticket blank 56 bounded by a pair of perforations 58 and 59. As the blank 56 moved from the roll 52 toward the roll 54, the leading edge (perforation 58) initially encountered a printer 68. Several forms of printing apparatus might be employed as the printer 68. Of course, the indicia I (FIG. 1) may be deposited on the cards in a wide variety of different formats; however, more directly in relation to the system of the present invention, the printer 68 also deposits the magnetic stripe S. As indicated above, the printer 68 may be a relatively high speed apparatus producing normally intolerable defects in the stripe S. While the printer 68 may deposit magnetic stripes S as a continuous line, monitoring and control with respect to individual ticket blanks are provided by the control unit 66.

As the leading edge of a ticket blank 56 moves (left to right) beyond the printer 68, it reaches a sensor 70, connected to the control unit 66 and a record counter 72 (upper left). Functionally, the counter 72 is cleared at the leading edge of each ticket (defined by a perforation) and subsequently tallies bit-location pairs of record quality. A signal G provided from a test circuit 74 (lower right) as described below provides signals G for good pairs. If the magnetic stripe S of a ticket does not possess a sufficient number of record-quality, bit-location pairs, a bad ticket signal BT is provided from the counter 72 to the control unit 66.

Passing from the sensor 70, the blank 56 passes under a series of magnetic transducer heads. The heads are in pairs and, accordingly, define the magnetic stripe S as two parallel elongate recording tracks A and B as explained above. In order, the tracks A and B are scanned by: record heads 76 and 78, sensor heads 80 and 82, then erase heads 84 and 86. The cyclic operation of the heads define the bit locations along the lengths of the tracks A and B. Note that as described herein, the association of bit locations in pairs is based on a side-by-side relationship. In fact, the associated pairs of bit locations may be separated along the tracks as to accommodate positioning. It is to be understood that in accordance with the present development, "associated pairs" of bit locations are pairs that are combined to function cooperatively.

The record heads 76 and 78 are driven electrically by a pulse record circuit 88 actuated by the control circuit 66. The sensor or read heads 80 and 82 (track A and track B, respectively) are connected, respectively, to an "A" read circuit 90 and a "B" read circuit 92, in turn connected to the control unit 66 and the test circuit 74.

The erase heads 84 and 86 are controlled to clear any existing magnetic pulses from defective bit locations and also to erase recorded pulses selectively in good bit-location pairs to accomplish recorded intelligence. In that regard, the control unit 66 provides data signals to an information buffer 94, representative of the desired record for each ticket. Of course, a variety of recording techniques and codes may be utilized; however, in one illustrative format, a simple trinary code is illustrated. A somewhat more elaborate code is disclosed below; however, for the present, the simple trinary code will be used for purposes of explanation.

As indicated above, if a pair of bit locations is to record a "zero", the pulse in track B is erased. If the pair is to indicate a "one", the pulse in track A is erased. If the pair is to indicate a "two", neither bit location is cleared or erased. The data to be recorded on a magnetic stripe for each ticket (including initial value) is composed by the control unit 66, supplied to the information buffer 94, then formatted by an encoding unit 96 to drive an "A" erase circuit 98 and a "B" erase circuit 100. The erase circuits 98 and 100 are also driven by a "not-good" pulse NG from the test circuit 74. Thus, the signal NG is supplied to the "A" erase circuit 98 along with pulses from the encoding unit 96 through an "OR" gate 102. Similarly, the "B" erase circuit 100 is driven by the NG signal and the unit 96 through an "OR" gate 104.

The "A" erase circuit 98 is connected to drive the erase head 84 operating on track A of the magnetic stripe S. In a related manner, the "B" erase circuit 100 drives the erase head 86 on the track B.

Summarizing the operation of the erase circuits 98 and 100, bad location pairs are cleared (fully erased) and good location pairs are selectively erased to accomplish a binary record in accordance with the exemplary trinary code. Specifically, the operation is concisely stated as follows:

| Operation for Pairs | Track A | Track B |
| --- | --- | --- |
| Location pair bad: | erase | erase |
| Locaction pair good: | | |
| Record "zero" | leave pulse | erase |
| Record "one" | erase | leave pulse |
| Record "two" | leave pulse | leave pulse |

As explained above, completed good tickets pass from the erase heads 84 and 86 with the desired information digitally recorded on the magnetic stripe S. Bad tickets (with insufficient record space) are detected by the record counter 72 (FIG. 3, upper left) and are rejected. Specifically, a signal from the counter 72 indicates the number of good pairs to the control unit 66. If the number is not sufficient to record the desired data, a signal is applied to a cancellation printer 110 and a counter 112 (lower right).

The printer 110 may take various forms for voiding tickets. For example, the printer may simply deposit a diagonal line of red ink across void tickets. A spiral roller as well known in the art may be used. The counter 112 tallies the aggregate number of void tickets produced during a production run.

In view of the above explanation of the process and system of FIG. 3, an exemplary recording operation with respect to a specific ticket will now be described as the ticket blank 56 passes from the roll 52 to the roll 54. In that regard, it is to be stressed that the representations in FIG. 3 are for purposes of explanation and illustration with the consequence that neither scale nor proportion is preserved.

Pursing an exemplary operation, any of various trinary codes may be employed to encode the digital representations as explained above. Such techniques are well known in the prior art and in that regard, the control unit 66 functions along with the information buffer 94 and the encoding unit 96 to attain an initial code format for indicating a value, e.g. five dollars. It is contemplated that the record value will decrease as the ticket is used.

As the exemplary ticket blank 56 passes beyond the printer 68, the magnetic stripe S is deposited and cured to a "dry state". Additional printed material may also be deposited as explained above.

Bearing the magnetic stripe S, the leading edge of the ticket blank 56 is detected as the forward perforation 58 moves to the sensor 70. The resulting signal from the sensor 70 resets the counter 72 and synchronizes operations through the control unit 66. The magnetic stripe S of the ticket blank 56 then moves in sequence under the pairs of record heads, read heads, and erase heads. As a consequence, a process is performed as described with respect to FIG. 2. Specifically, the heads 76 and 78 record pulses in each pair of bit locations. The bit locations are then sensed with the resulting signals processed by the read circuits 90 and 92 and tested by the circuit 94. If both bit locations in a pair satisfactorily reproduce the pulses, a good signal G is supplied from the test circuit 74 to be tallied by the counter 72 and to qualify the selective erase operation as formulated by the control unit 66.

If one or both of the digit locations in a pair do not satisfactorily reproduce the recorded pulse, a "not good" signal NG is supplied from the test circuit 74 through the erase circuits 98 and 100 prompting the erase heads 84 and 86 to clear pulses from the pair of bit locations. Accordingly, as the exemplary card of section 56 moves from the heads 84 and 86, the magnetic stripe S is appropriately recorded unless the stripe is so defective that it will not accommodate the desired information. A bad ticket blank is detected when the trailing-edge perforation 59 reaches the sensor 70 to clear the counter 72. On that occurrence, the control unit 66 is actuated by the signal BT to drive the cancellation printer 110 and the "bad ticket" counter 112.

Tickets T, completed as explained above, may be variously dispensed for use by passengers on a transportation system. Each time a ticket T (FIG. 1) is presented, the instant value is read from the stripe S, decreased to reflect the fare and a fresh value is recorded. In reading the stripe S, the pulses 22 are self-clocking and void bit locations are of no effect. Accordingly, conventional apparatus may be employed to read and record tickets with use.

As an alternative form to the trinary code as described above with respect to the pairs of bit locations, two-bit location pairs can be combined to represent three bits of information. Specifically, the following chart indicates such a combination of bit pairs, i.e. pair I and pair II, each pair capable of recording a pulse in either A or B. In the chart, the presence of a pulse is indicated by letters A and B.

| Bit Location Pair I | Bit Location Pair II | Code | Decimal Equivalent |
| --- | --- | --- | --- |
| AB | AB | 000 | 0 |
| A | AB | 001 | 1 |
| B | AB | 010 | 2 |
| AB | A | 011 | 3 |
| A | A | 100 | 4 |
| B | A | 101 | 5 |
| AB | B | 110 | 6 |
| A | B | 111 | 7 |
| B | B | SEPARATOR | |

If, for example, a ticket required eight decimal digits of information at four bits per digit, it could be recorded by twenty-two bit position pairs. For example, an airline ticket system required thirty alphanumeric characters, at six bits per character, and could be recorded by one hundred twenty bit position pairs. The combination code disclosed is exemplary of a multitude of possibilities that may be used in implementing a system of the present invention.

In view of the above descriptions, it may be appreciated that a system is disclosed for reliably using relatively unreliable or marginal magnetic medium. As indicated, various forms of the system may be utilized in relation to various documents, various recording mediums, various code systems and various applications. Consequently, it will be readily apparent that other forms of the system may be implemented and used. Accordingly, the scope hereof is deemed as set forth in the claims below.

What is claimed is:

1. A process for recording digital data on marginal magnetic medium comprising the steps of:
   defining a pair of record tracks on said magnetic medium with bit locations;
   recording a digit in each bit location of each record track of said magnetic medium;
   testing pairs of bit locations from said pair of record tracks to signal record quality for both locations in a pair with respect to said recorded digits, said pair of bit locations including a bit location from each track; and
   altering the record of said magnetic medium to record digital data selectively in pairs of bit locations signaled to be of record quality by said testing step.

2. A process according to claim 1 further including a step of printing a magnetic stripe on a support strata to provide said magnetic medium.

3. A process according to claim 1 further including a step of accounting for locations signaled to be of record quality.

4. A process according to claim 3 further including a step of rejecting magnetic media which does not have a predetermined minimum number of locations of record quality.

5. A process according to claim 1 wherein said step of recording a digit comprises recording pulses in said bit locations.

6. A process according to claim 5 wherein said step of altering comprises erasing pulses from said bit locations.

7. A process according to claim 1 wherein said step of altering comprises combining pairs of said pairs of bit locations and altering in accordance with a four-bit code to record data.

8. A digital data recording system for marginal magnetic medium, comprising:
magnetic means for defining a pair of record tracks on said magnetic medium, said record tracks each including a series of bit locations;
record means for magnetically recording a digit in each bit location of each of said record tracks;
test means for testing identified pairs of bit locations to indicate pairs of record quality, each pair including one bit location from each of said tracks;
alteration means to alter the recording in said pairs of record quality to indicate said digital data and for clearing other pairs.

9. A digital data recording system according to claim 8 further including means for keeping a record of said pairs of record quality.

10. A digital data recording system according to claim 8 wherein said record means includes magnetic record head means and means for moving said magnetic medium relative to said head means.

11. A digital data recording system according to claim 10 wherein said means for moving comprises a continuous feed means carrying documents bearing said magnetic medium.

12. A digital data recording system according to claim 11 further including printer means to print said magnetic medium.

13. A digital data recording system according to claim 11 further including means for keeping a record of said pairs of record quality and means for voiding documents under control of said means for keeping a record.

14. A digital data recording system according to claim 8 wherein said alteration means comprises magnetic erase means.

* * * * *